United States Patent [19]

Groves et al.

[11] 4,268,716
[45] May 19, 1981

[54] AUDIO TELECONFERENCING

[75] Inventors: Ian S. Groves; David R. Guard; Steven Whalley, all of Ipswich, England

[73] Assignee: Post Office, London, England

[21] Appl. No.: 966,636

[22] Filed: Dec. 5, 1978

[30] Foreign Application Priority Data

Dec. 5, 1977 [GB] United Kingdom ............... 50517/77

[51] Int. Cl.³ ............................................. H04M 3/56
[52] U.S. Cl. ............................ 179/1 CN; 179/18 BC
[58] Field of Search ........... 179/1 CN, 18 BC, 18 AF

[56] References Cited

U.S. PATENT DOCUMENTS

| | | | |
|---|---|---|---|
| 3,515,807 | 6/1970 | Clark | 179/18 BC |
| 3,983,332 | 9/1976 | Patten | 179/1 CN |
| 4,046,966 | 9/1977 | Urui | 179/18 BC |
| 4,197,429 | 4/1980 | Sparber | 179/18 BC |

Primary Examiner—Bernard Konick
Assistant Examiner—Randall P. Myers
Attorney, Agent, or Firm—Cushman, Darby & Cushman

[57] ABSTRACT

A control unit for establishing a four-wire connection between two terminals via a pair of telephone lines comprises switching means which are operable to provide a connection to a pair of telephone lines, signalling means connectible to said lines via said switching means to enable another control unit to be signalled via a line, and line send and receive circuitry connected to the switching means. The line send and receive circuitry has an input for connection to the send channel of a terminal and an output for connection to the receive channel of the terminal. A central control controls operation of the switching means and line send and receive circuitry to automatically establish a four-wire connection and adjust parameters of the line send and receive circuitry to compensate for loss on the telephone line.

9 Claims, 5 Drawing Figures

AUDIO TELECONFERENCING

DESCRIPTION

This invention relates to a control unit for establishing a four-wire connection between two terminals via a pair of telephone lines. The invention has particular application to a a control unit for establishing teleconference calls over a public switched telephone network.

In U.S. Ser. No. 953,280 there is described a terminal unit for an audio teleconferencing system in which one or more persons seated around a conference table at a first location can converse with other persons situated at another similar location. Each terminal unit has one or more loudspeakers and microphones which are linked by control equipment and telephone lines to loudspeakers and microphones at other locations. In the arrangement described in the above mentioned Application the connection between the locations is by a private circuit. The present Application is concerned with a control unit which allows audio teleconference terminals to be connected to each other via the public switched telephone network.

According to the present invention there is provided a control unit for use in establishing a four-wire connection between two terminals via a pair of telephone lines, said unit comprising switching means arranged to provide a connection to a pair of telephone lines, signalling means connectible to said lines via said switching means to enable another control unit to be signalled via a line, line send and receive circuitry connected to said switching means, said line send and receive circuitry having an input for connection to the send channel of a terminal and an output for connection to the receive channel of the terminal, and a central control for controlling operation of the control unit.

The switching means may comprise one or more relays.

The switching means may be connected to the telephone lines by a circuit which includes a line connected and ringing current detector for each line.

The signalling means may comprise a telephone instrument.

The line receive circuitry may be connected to the receive channel of said terminal by a variable gain amplifier the gain of which can be varied under the control of said central control.

The unit may include second switching means operable under the control of the central control to connect the variable gain amplifier either directly to the line receive circuitry or to the line receive circuitry by a filter.

The unit may include adjustable frequency equalisation means connected between the output of the amplifier and the receive channel of said terminal, said frequency equalisation means being adjustable under the control of said central control.

The unit may include signal generating means for generating signals of one or more predetermined frequencies, and third switching means operable under the control of said central control to connect the generating means to the line send circuitry.

The central control may include a microprocessor and associated memories.

In a teleconferencing system having two teleconference terminals each terminal has a control unit. A call is set up over one line from one terminal and received by another terminal. The unit automatically adjusts the gain in the receive channel at the one terminal to compensate for line loss. A second call is then set up for the second line in a similar manner.

The invention will be described now by way of example only with particular reference to the accompanying drawings. In the drawings.

The present control unit is designed to establish a four-wire link via the public switched telephone network between two teleconference terminals. The teleconference terminals can be of the type described in our co-pending U.K. Application No. 45775/77. This arrangement allows one or more persons at a first location to converse with one or more persons at a second location. Such a link requires two telephone lines in order to provide independent transmit and receive channels and it will be assumed that the lines are simple direct exchange lines or private automatic branch exchange extensions which use strowger signalling. The control unit however could be modified to work with other signalling systems.

Figure 1:
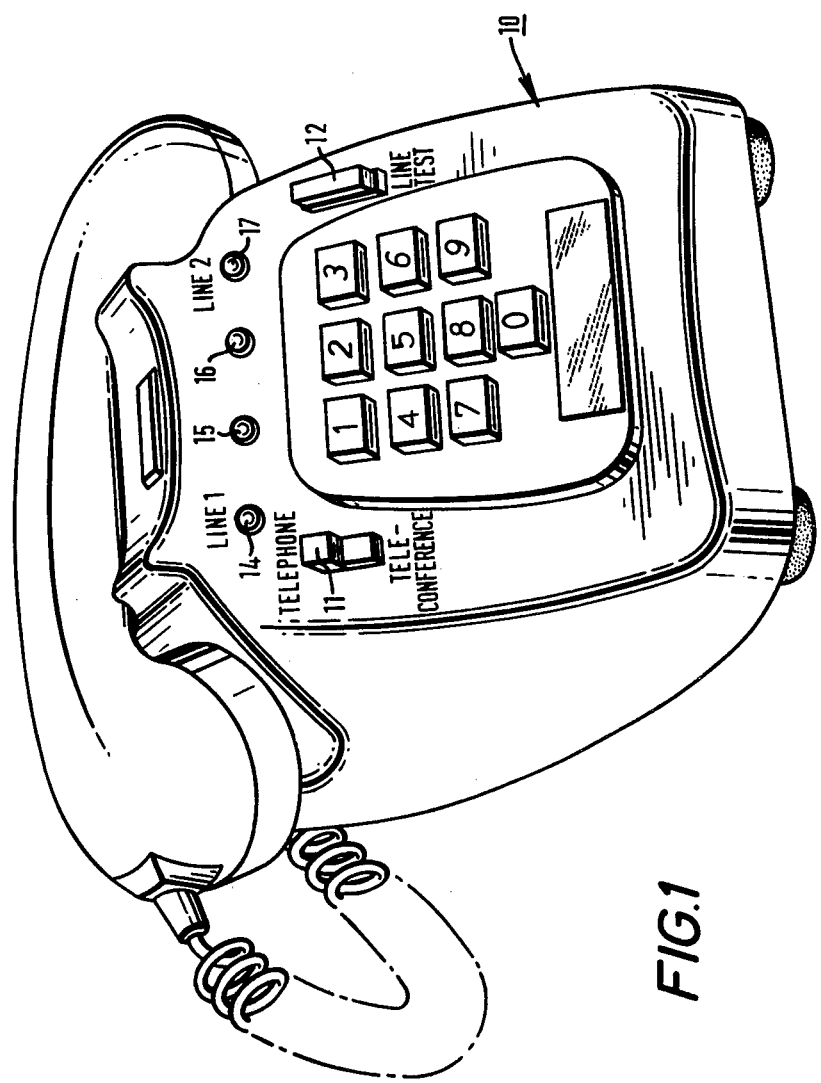
FIG. 1 is a perspective view of a control telephone instrument for use in the control unit of the present invention.

The control unit comprises a main electronics unit having a microprocessor and associated circuits together with a control telephone instrument. The control telephone instrument 10 is illustrated in FIG. 1 and is similar in appearance to a conventional telephone instrument. In addition to the normal number buttons the instrument has a switch 11 which is a two position switch, a push botton switch 12 and four light emitting diodes 14, 15, 16, 17.

Figure 3:
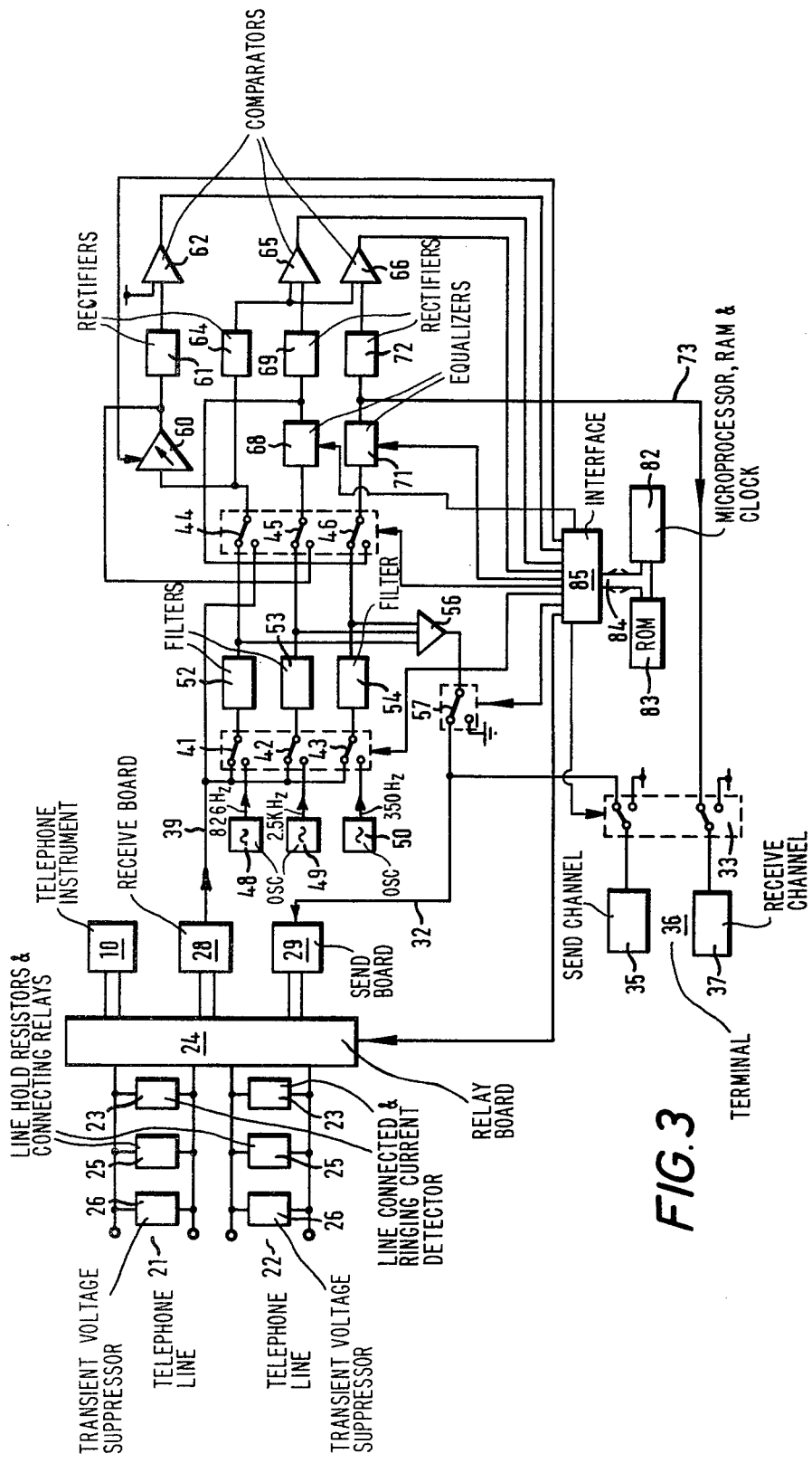
FIG. 3 is a block diagram of a control unit in accordance with the present invention.

The control unit is shown schematically in FIG. 3. The control unit comprises a relay board 24 which is connected to two telephone lines 21, 22 via circuits 23 each of which contain a line connected and a ringing current detector, circuits 25 each of which includes line hold resistors and connecting relays, and transient voltage suppressors 26 connected across the respective line. The relay board ("board" is herein used in the conventional sense to refer to a printed circuit board type of circuit structure) 24 is connected to a receive board 28 and a send board 29. The boards 28 and 29 contain send and receive amplifiers and associated transformers.

The send board 29 has an input via a line 32 and switch 33 from the send channel 35 of a teleconference terminal indicated generally at 36. The terminal 36 is described in U.K. Patent Application No. 45775/77 and its send channel 35 includes one or more microphones and circuitry for processing the microphone output signals prior to their transmission along a telephone line.

The receive board 28 has an output line 39 which is connected in parallel to one terminal of three switches 41, 42, 43 and to one terminal of a switch 44 in a bank of switches 44, 45, 46. Three oscillators 48, 49, 50 are connected respectively to a second terminal of the switches 41, 42, 43. The oscillator 48 is arranged to generate a 826 Hz square wave signal, the oscillator 49 a 2.5 KHz square wave signal and the oscillator 50 a 350 Hz square wave signal. A third terminal of the switch 41 is connected to a narrow band filter 52 centred on 826 Hz, a third terminal of the switch 42 is connected to a narrow band filter 53 centred on 2.5 KHz; and a third terminal of the switch 43 is connected to a narrow band filter 54 centred on 350 Hz. The switches 41 to 43 allow the filters 52 to 54 to be connected either to the receive board 28 or to respective oscillators 48, 49, 50.

The filters 52 to 54 are connected respectively to a second terminal of the switches 44 to 46 and also to the inputs of a summing circuit 56. The output of the summing circuit 56 is connected by a switch 57 to the line 32.

A third terminal of the switch 44 is connected by a variable gain amplifier 60 and rectifier 61 to one input of a comparator 62. The other input to the comparator 62 is a reference signal. The third terminal of the switch 44 is also connected by a rectifier 64 to one input of comparators 65, 66. The output of the amplifier 60 is connected to the first terminal of the switch 45.

A third terminal of the switch 45 is connected by a 2.5 KHz equaliser 68 and a rectifier 69 to the second input of the comparator 65. The equaliser 68 is also connected to the first terminal of the switch 46. The third terminal of the switch 46 is connected by a 300 Hz equaliser 71 and a rectifier 72 to the second input of the comparator 66. The output of the equaliser 71 is connected by a line 73 and the switch 33 to the receive channel 37 of the terminal 36. The receive channel includes circuitry for processing signals received from the control unit and one or more loudspeakers.

The control unit includes a microprocessor, random access memory (RAM) and clock board 82 and a read-only memory (ROM) board 83. The boards 82 and 83 are connected via a bus 84 to an interface board 85. The interface board 85 is linked to the relay board 24 and hence to the control telephone instrument 10 (also shown in FIG. 1), to the switches 41 to 43, to the switches 44 to 46, to the variable gain amplifier 60, to the equalisers 68 and 71, to the comparators 62, 65 and 66 and to the switches 57 and 33. The board 24 can establish a connection between the lines 21, 22 and the boards 28, 29 or between the lines 21, 22 and the telephone instrument 10.

The filter and equaliser circuits can be switched into or out of a transmission path from a teleconference terminal 36 to the telephone lines 21, 22 under the control of the microprocessor 82 in accordance with instructions given by a user via the control telephone 10. In the transmit direction from the terminal 36 the path is from the send channel 35 of the teleconference terminal via the switch 33, send board 29, relay board 24 to one of the pair of lines 21 or 22. In the receive direction connection is made from the board 24 to the board 28, via the switch 44, amplifier 60, switch 45, equaliser 68, switch 46, equaliser 71 and switch 33 to the receive channel 37. The amplifier 60 can provide up to 40 dB of amplification in discrete steps and is used to equalise the signal loss due to the telephone connection. The gain is adjusted under the control of the microprocessor 82 during a line test sequence an example of which will be described below. Once the gain has been set it is held for the duration of a call. The filters 52, 53, 54 are switched into the receive path during a test sequence to discriminate between a wanted test tone signal and any noise or speech voltage on the line. The filters are also used to remove harmonics of the square wave oscillators 48, 49, 50 and so provide stable low distortion sine waves used for a test signal.

The comparator 62 is arranged to compare the output of the rectifier 61 with a reference voltage during a line test sequence. The output of the comparator is sensed by the microprocessor 82 which causes the gain of the amplifier 60 to be varied in increments of 0.8 dB until the inputs to the comparator are equal when the comparator output changes level. This change of level is sensed by the microprocessor and the gain of the amplifier 60 is fixed. The amplifier 60 is an operational amplifier with a ring of resistors which are switched in or out to vary the gain.

The comparator 65 is arranged to compare the output of the rectifier 69 with the output of the rectifier 64, and the comparator 66 is arranged to compare the output of the rectifier 72 with the output of the rectifier 64. The outputs of the comparators 65 and 66 are sensed by the microprocessor which adjusts the frequency equalisation circuits 68 and 71 until the response of the unit is more or less the same at 350 Hz and 2.5 Hz as at 826 Hz.

The digital control function is provided by the microprocessor 82, memory 83 and interface 85. The interface board 85 modifies the level or period of the microprocessor bus signals to switch relays on the board 24, light emitting diodes on the instrument 10 or switch transmission gates as appropriate to connect in the required analogue circuits.

The relays on the relay board are conventional relays with associated drive transistors. The transistors are switched on in response to a change in level of the signal from the interface 85 to energise the appropriate relays.

The switches 33, 41, 42, 43, 44, 45, 46 and 57 are transmission gates (CMOS FET gates) which are operated in response to a simple level change in the appropriate output of the interface board.

Figure 4:
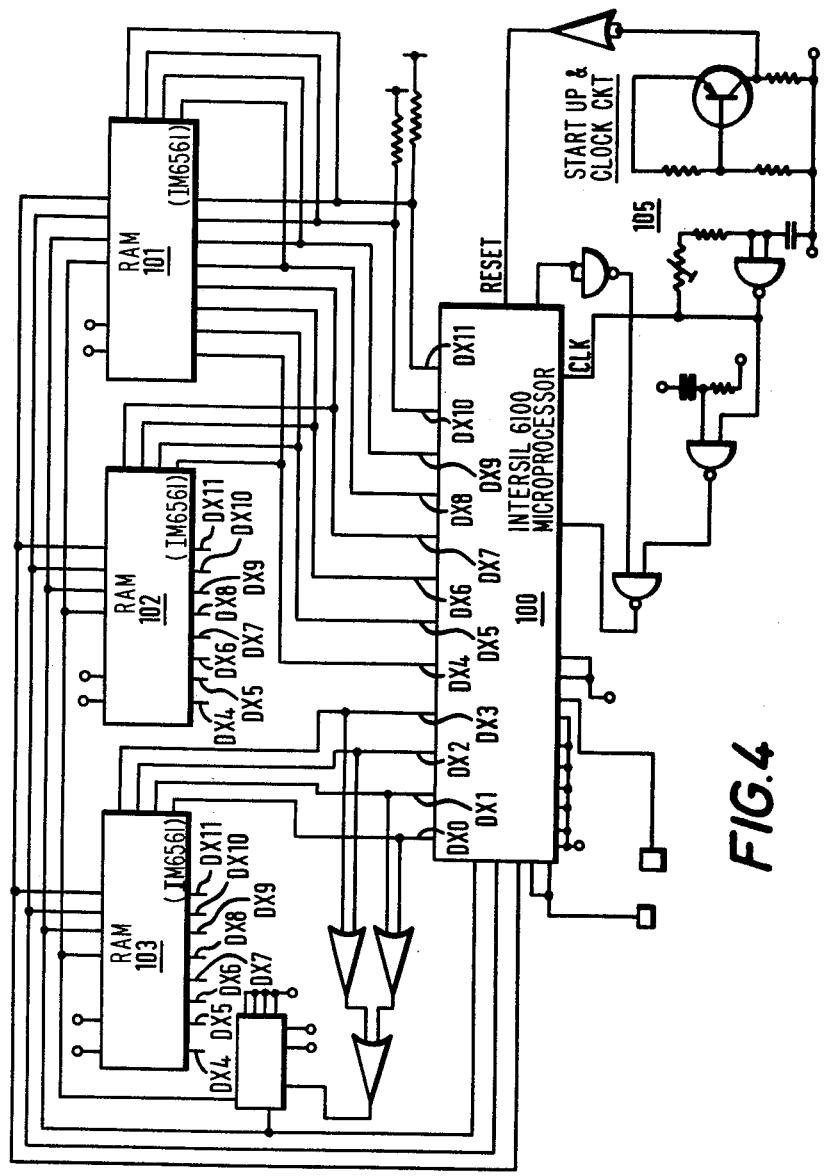
FIGS. 4 to 5 show in more detail the microprocessor and associated circuits.

FIG. 4 illustrates the microprocessor and associated circuitry. The microprocessor comprises an Intersil 6100 device 100 with three random access memories 101, 102 and 103 (IM 6561 devices) and start up and clock circuitry illustrated at 105. The Intersil 6100 is programmed substantially in accordance with programming instructions in the operating manual of the device.

Figure 5:
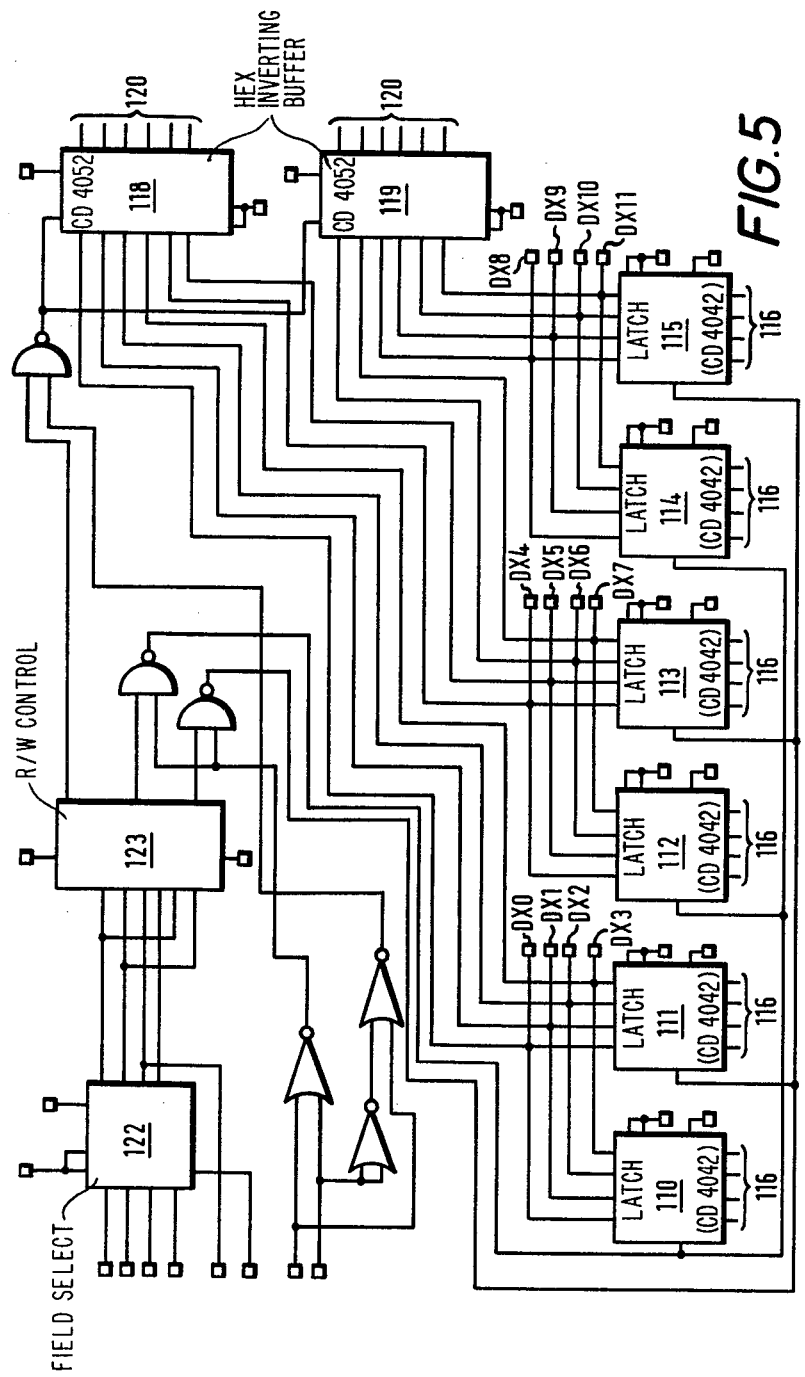

The data lines DX0 to DX11 are taken in parallel to a memory board and also to the interface unit shown in FIG. 5. The memory board (not shown) is a commercially available Intersil 6952 ROM.

The peripheral interface unit shown in FIG. 5 comprises 6 four bit latches (CD 4042 devices) 110 to 115 which provide 24 output ports 116 to the elements controlled by the microprocessor, and two hex inverting buffers (CD 4052) 118, 119 which provide 12 input ports 120 from circuit elements (telephone switch hook contacts and comparators 62, 65, 66) whose voltage levels are sensed by the microprocessor. The other two integrated circuits 122, 123 provide field select and read-write control.

The output ports 116 are connected via further interface circuitry (not shown) to the drive transistors of the relays on the board 24, and the switch transmission gates 33, 41 to 46 and 57. The further circuitry is to provide current gain for driving the relays and illuminating the lamps on the telephone instrument 10 and to provide ±5 volt drives for the transmission gates.

Figure 2:
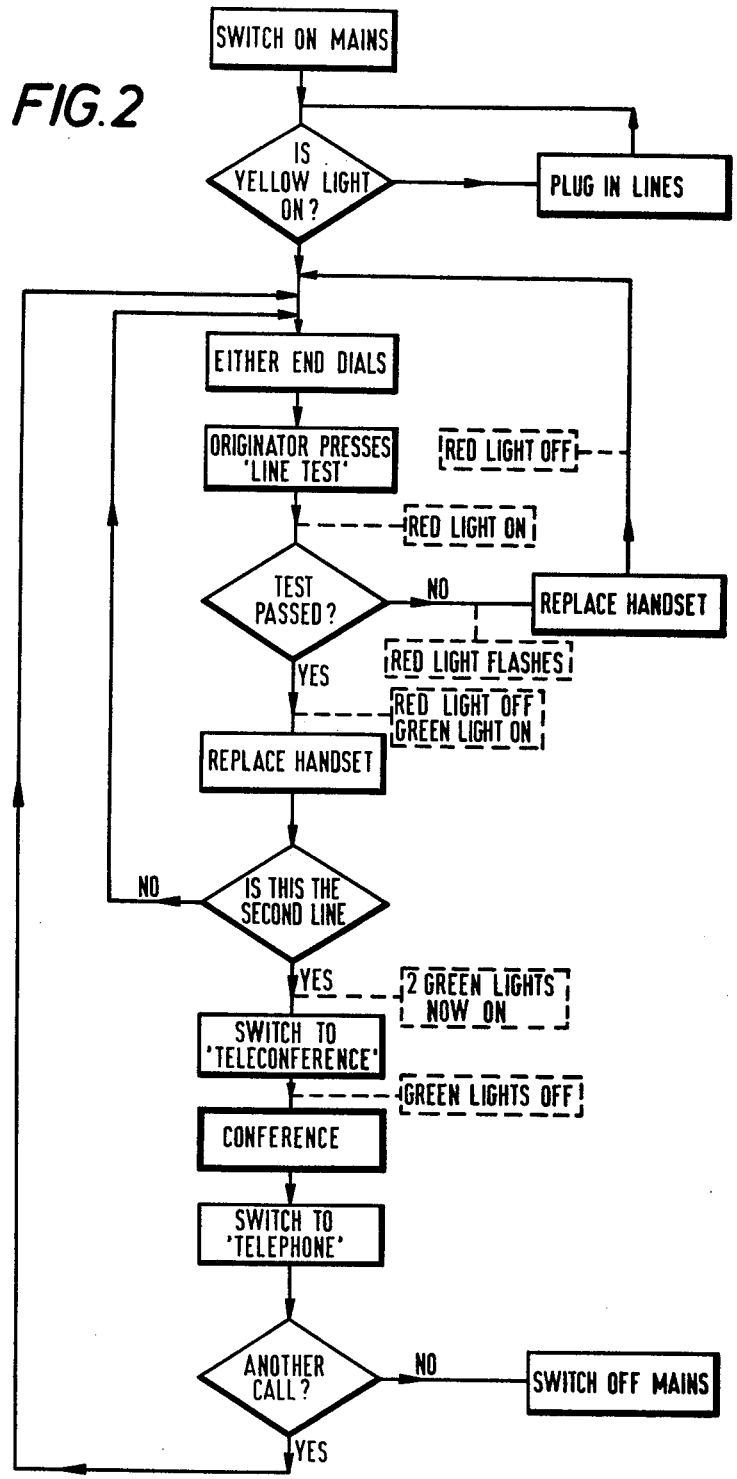
FIG. 2 is a flow diagram illustrating the operation of the present control unit.

The operation of the control unit in setting up a 4-wire link between two teleconference terminals will now be described and the sequence of the various operations is illustrated in the flow diagram of FIG. 2.

The initial operation is to switch on the mains supply to the unit which initiates the microprocessor control logic. A check is made to ensure both telephone lines 21, 22 are connected to the system since they may be terminated on a plug and socket. The yellow light emitting diode 15 on the telephone instrument 10 is illuminated when the connections are made correctly.

A user initiates the first call by lifting his handset and the microprocessor 82 interprets this action and connects the standard telephone transmission circuit to the first exchange line 21 or 22. A dial tone is then returned to the handset earpiece by the exchange in the normal manner. The user then enters one of the telephone numbers of the terminal with which he wishes to be connected and the transmission circuit is disconnected from the line and the keyed number interpreted and passed to the pulse out circuit in the signalling unit which is now connected to the line. The transmission circuit is disconnected during signalling to prevent damage to a user's hearing during pulse out and reconnected at the end of the pulse out sequence when the signalling unit is disconnected.

If the terminal being called is engaged the user will hear an engaged tone in the normal manner. If it is not engaged the ringing current detector in the far terminal will detect the incoming ringing current and connect a tone caller to the appropriate line. When the far terminal lifts his handset to answer the call his transmission circuit is connected across the appropriate line and the tone caller is disconnected. The exchange removes ringing current and completes the connection in a conventional manner. The parties are then free to converse as in a normal telephone connection. The user who initiated the call now pushes the test line button 12 on his telephone instrument. The telephone transmission circuit is again removed from the line, the red light emitting diode is illuminated to indicate the test is in progress and a test tone is connected to the telephone line. On receipt of this tone at the far terminal the transmission circuit is removed from the line and a light emitting diode is illuminated to indicate the test is in progress. At this stage the switches 41 to 43 and the switches 44 to 46 are in the position shown in FIG. 3. The switch 57 of the unit at the other terminal will be in a position which connects the circuit 56 to its send board 29. The gain of the amplifier 60 is then adjusted automatically under the control of the microprocessor until the level of the received tone reaches a pre-set value determined by the comparator 62 and the gain of the amplifier is then held at that value for the duration of the teleconference call. The circuits 68 and 71 are adjusted similarly at the same time. Assuming the preset level for the test tone can be obtained within the range of gain variation of the amplifier 60 the test is deemed successful. A tone is then returned from the far terminal to signal the success, the red light emitting diodes go out, a first green light emitting diode 14 on the control telephone instrument at each end lights and the telephone transmission circuits are reconnected to the line, the test sequence having lasted approximately 10 seconds. The parties are then able to converse freely again over the control telephones and establish who is to make the second call before replacing their handsets.

The procedure is then repeated to set up the second required telephone line. If the far terminal makes the second call the operation is as already described above. If the near terminal makes the second call although the user operations are identical there are differences in their interpretation since for example the near terminal must signal the far terminal to provide the test tone for setting up the receive channel gain in the near terminal.

When the second test has been successfully completed the second green light emitting diode 17 lights on the control telephone instrument and the parties are able to converse over the control telephone. To switch over to the audio teleconference equipment the handsets are replaced on the control telephones and the switch 11 is turned to a position indicated "teleconference". The green light emitting diodes are turned off and the audio teleconference terminal at each end is connected to the telephone circuits via the gain equalising amplifiers 29 enabling the conference participants to hold their conference.

When the 4-wire connection has been established the switches 44 to 46 have been changed from their position shown in FIG. 3 so that the receive board 28 is directly connected to the amplifier 60 which in turn is connected via the equalisers 68 and 71 to the switch 33.

To terminate the call the switch 11 is returned to the telephone position and this action clears the lines originated from that terminal and resets the control logic ready to initiate further calls. Turning the mains supply off and on will have the same effect.

If when setting up either of the connections the test tone falls outside the range of gain variation of the amplifier the test is deemed unsuccessful. In this case a red light emitting diode 16 flashes and the telephone transmission circuits are reconnected to the lines to enable the parties to converse. When the handsets are replaced the red light emitting diode is turned off and the control logic is reset to allow a second attempt at setting up that connection.

A further test for line noise can also be included in the test sequence although if a noise reduction circuit is included in the teleconference terminal this test is probably unnecessary.

The control telephones can be used to make and receive calls in the normal manner although some features differ slightly from those of a standard telephone 746.

1. Once a call has been established and successfully tested, i.e. the green light emitting diode is lit, further depressions of the keypad are ignored. When a call is received depressions of the keypad are always ignored. In a conventional telephone the transmission circuit is disconnected by the off normal contacts during dialling or pulse out even after a call has been established.

2. When the handset is lifted and the control circuit has connected the transmission circuit to the first line, a loop is placed on the second line to indicate to the exchange that the terminal is busy and that engaged tone should be returned to the calling subscriber.

3. An electret or other linear microphone is used to improve the telephone speech quality.

As described the control unit is used to set up a 4-wire link between teleconference terminals. It can also be used to set up a link between other types of terminal e.g. data modems. In this case phase equalisation as well as amplitude and frequency equalisation is necessary.

We claim:

1. A control unit for use in establishing a four-wire connection between two audio teleconference terminals, each having line send and line receive channels, via a pair of telephone lines of the public switched telephone network, said unit comprising:

switching means arranged to provide connections to a pair of telephone lines, signalling means connectable to said lines via said switching means to enable another similar control unit to be signalled via a telephone line, compensation means, line send and receive circuitry connected to said switching means and having an input for connection to the send channel and an output which can be connected to the receive channel of a teleconference terminal via said compensation means, said compensation means being adjustable automatically to compensate for the characteristics of a telephone line connected to the unit, and a central control means for controlling operation of the control unit including the automatic adjustment of said compensation means.

2. A control unit as in claim 1 wherein said switching means comprises one or more relays.

3. A control unit as in claim 1 wherein said switching means is connected to said telephone lines by circuits which include a line connected and ringing current detector for each line.

4. A control unit as in claim 1 wherein said signalling means comprises a telephone instrument.

5. A control unit as in claim 1 wherein said compensation means includes a variable gain amplifier, the gain of which is varied under the control of said central control means.

6. A control unit as in claim 5 including second switching means, operable under the control of said central control means, to connect said variable gain amplifier either directly to said line receive circuitry or indirectly to the line receive circuitry via a filter.

7. A control unit as in claim 5 wherein said compensation means includes adjustable frequency equalization means connected between the output of said amplifier and the receive channel of said terminal, said frequency equalization means being adjusted under control of said central control means.

8. A control unit as in claim 5 including signal generating means for generating signals of one or more predetermined frequencies, and third switching means operated under control of said central control means to connect said generating means to said line send circuitry.

9. A control unit as in claim 1 wherein said central control means comprises a microprocessor and associated memories.

* * * * *